(12) United States Patent
Hattori et al.

(10) Patent No.: US 8,022,121 B2
(45) Date of Patent: Sep. 20, 2011

(54) RUBBER COMPOSITION FOR STUDLESS TIRE AND STUDLESS TIRE

(75) Inventors: Takayuki Hattori, Kobe (JP); Ryoji Kojima, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 12/813,945

(22) Filed: Jun. 11, 2010

(65) Prior Publication Data

US 2010/0317782 A1    Dec. 16, 2010

(30) Foreign Application Priority Data

Jun. 12, 2009 (JP) ................................. 2009-141479
Apr. 6, 2010  (JP) ................................. 2010-088013

(51) Int. Cl.
*C09D 101/18* (2006.01)
*C08K 5/09* (2006.01)

(52) U.S. Cl. ........................................ 524/32; 524/300

(58) Field of Classification Search ................ 524/32
See application file for complete search history.

(56) References Cited

U.S. PATENT DOCUMENTS

2005/0234165 A1* 10/2005 Schaal et al. ............... 524/210

FOREIGN PATENT DOCUMENTS

| JP | 07-258469 A | 10/1995 |
|----|-------------|---------|
| JP | 08-300904 A | 11/1996 |
| JP | 09-151276 A | 6/1997 |
| JP | 2001-192503 A | 7/2001 |
| JP | 2002-097304 A | 4/2002 |
| JP | 2003-213039 A | 7/2003 |
| JP | 2005-126555 A | 5/2005 |
| JP | 2007-169500 A | 7/2007 |
| JP | 2007-176417 A | 7/2007 |
| JP | 2007-204735 A | 8/2007 |
| JP | 2007-277289 A | 10/2007 |
| JP | 2007-321041 A | 12/2007 |
| JP | 2009-001720 A | 1/2009 |
| JP | 2009-062039 A | 3/2009 |
| WO | WO2010000294 | * 1/2010 |

* cited by examiner

*Primary Examiner* — Ling-Siu Choi
*Assistant Examiner* — Hui Chin
(74) *Attorney, Agent, or Firm* — Birch, Stewart, Kolasch & Birch, LLP

(57) ABSTRACT

The present invention provides a rubber composition for a studless tire and a high-performance studless tire produced therefrom, which achieve good braking force and handling stability on ice and snow. The rubber composition for a studless tire includes: a rubber component; a zinc salt of a C4-C12 aliphatic carboxylic acid, or a C4-C12 aliphatic carboxylic acid and zinc oxide; and an oil or a plasticizer. The rubber component contains 40% by mass or more of butadiene rubber per 100% by mass of the rubber component.

10 Claims, No Drawings

RUBBER COMPOSITION FOR STUDLESS TIRE AND STUDLESS TIRE

TECHNICAL FIELD

The present invention relates to a rubber composition for a studless tire (a winter tire) and a studless tire.

BACKGROUND ART

Use of spike tires has been banned by law in Japan so as to prevent powder dust pollution resulting from the use of spike tires. As a result, studless tires are now used instead of the spike tires in cold regions. The studless tires can have better grip performance on ice and snow when they have a lower elastic modulus at low temperatures and have higher traction, for example. In particular, the braking force on ice is largely affected by the effective contact area between rubber and ice. There is therefore a demand for a vulcanized rubber composition that is flexible at low temperatures, which can provide a larger effective contact area.

Disadvantageously, decrease in only the hardness of a vulcanized rubber composition by, for example, increasing the oil amount causes poor handling stability.

Generally, tread rubber of studless tires is often produced from natural rubber or butadiene rubber as a main ingredient (for example, see Patent Document 1). This is because these rubbers have a low glass transition temperature and flexibility, as well as high strength. However, natural rubber and butadiene rubber suffer reversion upon sulfur vulcanization. This phenomenon causes degradation of the rubber or deterioration of the cross-linking state of the rubber, and thereby the elastic modulus at low temperatures of the rubber is decreased. Further, the inventors of the present invention have found from their studies that the phenomenon causes excessive decrease in the hardness of the rubber, resulting in poor handling stability and poor abrasion resistance. In addition, reversion may excessively increase tan δ at high temperatures, which may cause poor fuel economy.

In some cases, tires, not limited to studless tires, are vulcanized at higher temperatures so as to be produced at higher productivity. In such cases, the aforementioned phenomenon more remarkably occurs. Accordingly, there is an additional problem of decrease in abrasion resistance caused by the reversion.

Conventionally, vulcanizable rubber compositions used in rubber products such as tires are prevented from suffering reversion and are allowed to have better heat resistance in the case of containing a vulcanization accelerator in a proportion higher than that of sulfur (a vulcanizing agent), or containing a thiuram vulcanization accelerator as a vulcanization accelerator, for example. Further, rubber compositions are known to be prevented from suffering reversion in the case of containing a cross-linking agent that is capable of forming a long chain cross-linking structure represented by formulas such as —$(CH_2)_6$—S—. Examples of the cross-linking agent include PERKALINK 900 and Duralink HTS (each produced by Flexsys), and Vulcuren KA9188 (produced by Bayer AG). These techniques effectively inhibit the reversion of natural rubber or isoprene rubber; however, the techniques disadvantageously have a less or no inhibiting effect on the reversion of butadiene rubber.

Patent Document 1: JP 2007-169500 A

SUMMARY OF THE INVENTION

An object of the present invention is to provide a rubber composition for a studless tire and a high-performance studless tire produced therefrom, which solve the aforementioned problems and achieve good braking force and handling stability on ice and snow. Another object of the present invention is to produce the rubber composition and the studless tire at higher productivity and to offer them to consumers at lower prices.

The present invention relates to a rubber composition for a studless tire including: a rubber component; a zinc salt of a C4-C12 aliphatic carboxylic acid, or a C4-C12 aliphatic carboxylic acid and zinc oxide; and an oil or a plasticizer, the rubber component containing 40% by mass or more of butadiene rubber per 100% by mass of the rubber component.

The rubber composition preferably further includes 10 parts by mass or more of silica per 100 parts by mass of the rubber component.

The present invention also relates to a studless tire having a tread produced from the rubber composition.

The present invention provides a rubber composition for a studless tire including: a rubber component; a zinc salt of a C4-C12 aliphatic carboxylic acid, or a C4-C12 aliphatic carboxylic acid and zinc oxide; and an oil or a plasticizer, the rubber component containing 40% by mass or more of butadiene rubber per 100% by mass of the rubber component. Thus, a studless tire produced therefrom has good braking force and handling stability on ice and snow.

BEST MODE FOR CARRYING OUT THE INVENTION

The rubber composition for a studless tire of the present invention contains a rubber component; a zinc salt of a C4-C12 aliphatic carboxylic acid, or a C4-C12 aliphatic carboxylic acid and zinc oxide; and an oil or a plasticizer. The rubber component contains 40% by mass or more of butadiene rubber per 100% by mass of the rubber component.

In the rubber composition, the rubber component contains 40% by mass or more of butadiene rubber (BR) per 100% by mass of the rubber component. A BR-containing studless tire has better braking force and handling stability on ice. The lower limit of the BR content is preferably 45% by mass, more preferably 55% by mass, and further preferably 60% by mass. The BR content is preferably as high as possible for providing better braking force and handling stability on ice and snow. The BR content is preferably 80% by mass or more, and most preferably 100% by mass. BR in an amount of less than 40% by mass is less likely to provide a low glass transition temperature, causing poor braking force on ice and snow. On the other hand, BR in a too large amount tends to provide poor mechanical strength and poor abrasion resistance although providing good performance on ice and snow. In this case, the BR content may be set to preferably 85% by mass or less, more preferably 75% by mass or less, and further preferably 65% by mass or less. In the present invention, the rubber composition having a BR content as high as possible can provide better abrasion resistance and better performance on ice and snow.

The BR to be used may have a cis content of 95% by mass or more and have a viscosity of 80 cps or higher in the form of a 5% solution in toluene at 25° C. The rubber composition may be more easily processed and may be allowed to have better abrasion resistance in the case of containing such a BR. The viscosity of the BR solution in toluene is preferably 200 cps or lower. A BR having a viscosity of a 5% solution in toluene of higher than 200 cps may be too viscous, and thus the BR tends to have poor processability and not to be easily mixed with other rubbers. The viscosity is more preferably 110 cps or higher and 150 cps or lower.

In the case of containing a BR having a molecular weight distribution (Mw/Mn) of 3.0 or lower, the rubber composition may have a more appropriate viscosity and better processability, as well as better abrasion resistance. Also, a BR having an Mw/Mn of 3.0 to 3.4 may be used. Such a BR can provide better processability and abrasion resistance.

In the case of using a mixture of BR and other rubbers as the rubber component, examples of the other rubbers include, but not limited to, natural rubber (NR), epoxidized natural rubber (ENR), styrene-butadiene rubber (SBR), isoprene rubber (IR), ethylene-propylene-diene rubber (EPDM), chloroprene rubber (CR), acrylonitrile-butadiene rubber (NBR), butyl rubber (IIR), and halogenated butyl rubber (X-IIR). In particular, the rubber component preferably contains NR and/or ENR. This is because a rubber component containing these rubbers may be environment-friendly, may be less affected by a future decrease in oil supply, and may provide better abrasion resistance.

The rubber component may contain at least one functional group selected from the group consisting of an alkoxy group, an alkoxysilyl group, an epoxy group, a glycidyl group, a carbonyl group, an ester group, a hydroxy group, an amino group, and a silanol group (such a functional group is hereinafter referred to as a "functional group"). Such a functional group-containing rubber component may be a commercially available one or may be an appropriately modified one.

In the case of using BR in admixture with at least one rubber selected from the group consisting of NR, ENR, and IR, the total amount of these rubbers in the rubber component is preferably 70% by mass or more. The total amount of 70% by mass or more can provide good performance on ice and snow and better abrasion resistance. Even in such a case, the rubber composition of the present invention can also have sufficient reversion resistance. The total amount of these rubbers is more preferably 80% by mass or more, further preferably 90% by mass or more, and most preferably 100% by mass.

The rubber composition of the present invention contains (a) a zinc salt of a C4-C12 aliphatic carboxylic acid or (b) a C4-C12 aliphatic carboxylic acid and zinc oxide. The components (a) and (b) each can serve as an anti-reversion agent. The use of the zinc salt (a) or the mixture (b) allows the BR to have better reversion resistance and allows the composition containing silica to be more easily processed. Further, the rubber composition containing silica may be more effectively prevented from suffering reversion. The rubber composition of the present invention may contain both the zinc salt (a) and the mixture (b).

The aliphatic carboxylic acid in each of the zinc salt (a) and the mixture (b) may be of straight chain or of branched chain, or may have a cyclic structure such as a cycloalkyl group. Further, the aliphatic carboxylic acid may be either a saturated fatty acid or an unsaturated fatty acid. Furthermore, the aliphatic carboxylic acid may be an aliphatic polycarboxylic acid such as an aliphatic dicarboxylic acid or an aliphatic tricarboxylic acid. The components (a) and (b) may be of liquid form, and therefore the handleability of the components may be poor. In such a case, the components (a) and (b) may be supported by silica or the like.

The aliphatic carboxylic acid in each of the components (a) and (b) has 4 or more carbon atoms, preferably 6 or more carbon atoms, and more preferably 7 or more carbon atoms. An aliphatic carboxylic acid having less than 4 carbon atoms tends to be poorly dispersed. The aliphatic carboxylic acid has 12 or less carbon atoms, preferably 10 or less carbon atoms, and more preferably 9 or less carbon atoms. An aliphatic carboxylic acid having more than 12 carbon atoms may provide insufficient reversion resistance.

Examples of the aliphatic carboxylic acids in the components (a) and (b) include: saturated fatty acids such as butanoic acid, pentanoic acid, hexanoic acid, heptanoic acid, octanoic acid, nonanoic acid, decanoic acid, undecanoic acid, dodecanoic acid, isobutyric acid, isopentanoic acid, pivalic acid, isohexanoic acid, isoheptanoic acid, isooctanoic acid, dimethyloctanoic acid, isononanoic acid, isodecanoic acid, isoundecanoic acid, isododecanoic acid, 2-ethylbutyric acid, 2-ethylhexanoic acid, 2-butyloctanoic acid, succinic acid, glutaric acid, adipic acid, pimelic acid, suberic acid, and sebacic acid; and unsaturated fatty acids such as butenoic acid, pentenoic acid, hexenoic acid, heptenoic acid, octenoic acid, nonenoic acid, decenoic acid, undecenoic acid, and dodecenoic acid. In particular, 2-ethylhexanoic acid is preferable among these aliphatic carboxylic acids. This is because 2-ethylhexanoic acid greatly inhibits reversion, is industrially-supplied in abundance, and costs low. These aliphatic carboxylic acids may be used alone, or two or more of these may be used in combination.

Examples of the zinc oxide in the component (b) include ones conventionally used in the rubber industries. As specific examples, zinc oxide #1 and #2 (produced by Mitsui Mining & Smelting Co., Ltd.) may be used.

The zinc content in the zinc salt (a) and the zinc content in the total amount of the mixture (b) each are preferably 3% by mass or more, and more preferably 5% by mass or more. A zinc content of less than 3% by mass tends to provide insufficient reversion resistance. The zinc contents therein each are preferably 95% by mass or less, more preferably 90% by mass or less, further preferably 80% by mass or less, and most preferably 30% by mass or less. A zinc content of more than 95% by mass tends to cause poor processability and may lead to unnecessarily high costs.

The amount of the zinc salt (a) and the amount of the mixture (b) (the total amount of the aliphatic carboxylic acid and the zinc oxide) each are 0.2 parts by mass or more, preferably 0.5 parts by mass or more, further preferably 1 part by mass or more, and most preferably 1.4 parts by mass or more per 100 parts by mass of the rubber component. An amount of less than 0.2 parts by mass may provide insufficient reversion resistance and may be less likely to provide better handling stability. The amounts thereof each are 10 parts by mass or less, preferably 7 parts by mass or less, and more preferably 5 parts by mass or less per 100 parts by mass of the rubber component. An amount of more than 10 parts by mass may cause bleeding or blooming, and may provide an excessively low viscosity and higher adhesion, which may result in poor processability. Further, the effects may not be commensurate with the increased amount and the cost tends to be unnecessarily high.

In the case where the rubber composition contains both the zinc salt (a) and the mixture (b), the aforementioned "zinc content" represents the zinc content in 100% by mass of the components (a) and (b) in total, and the aforementioned "amount" represents the total amount of the components (a) and (b). In the case where the rubber composition contains zinc oxide whiskers, the aforementioned "zinc content" and "amount" do not include the zinc content in the zinc oxide whiskers and the amount of the zinc oxide whiskers, respectively. In the case where the rubber composition contains the zinc oxide whiskers, the amount of other zinc oxides or the zinc contents in the components (a) and (b) may be reduced, or alternatively no other zinc oxide may be blended in the rubber composition.

The rubber composition contains an oil or a plasticizer. The rubber composition containing the oil or plasticizer is allowed to have an appropriately low hardness and provide good braking performance on ice. Examples of the oil and plasticizer include paraffinic process oils, aromatic process oils, and naphthenic process oils. In particular, the paraffinic process oils are suitably used as they provide good low-temperature properties and excellent performance on ice. Specific examples of the paraffinic process oils may include PW-32, PW-90, PW-150, and PS-32 (produced by Idemitsu Kosan Co., Ltd.). Specific examples of the aromatic process oils may include AC-12, AC-460, AH-16, AH-24, and AH-58 (produced by Idemitsu Kosan Co., Ltd.).

The amount of the oil or plasticizer is preferably 5 parts by mass or more, more preferably 10 parts by mass or more, and further preferably 15 parts by mass or more per 100 parts by mass of the rubber component. An oil or plasticizer in an amount of less than 5 parts by mass is less likely to provide sufficient performance on ice. The amount of the oil or plasticizer is preferably 60 parts by mass or less, more preferably 40 parts by mass or less, and further preferably 30 parts by mass or less per 100 parts by mass of the rubber component. An oil or plasticizer in a too much amount may cause poor abrasion resistance and further may cause poor reversion resistance. Further, even an aromatic oil or an alternative aromatic oil, each of which leads to a comparatively small reduction in abrasion resistance, may provide poor low-temperature properties, resulting in poor performance on ice and snow. In addition, such an aromatic oil or an alternative aromatic oil may provide high tan δ at high temperatures, resulting in deterioration in rolling resistance performance. Here, in the case where the rubber composition contains both the oil and the plasticizer, the "amount" defined above means the total amount of the oil and the plasticizer.

More preferably, the rubber composition further contains silica. The silica-containing rubber composition is allowed to provide better braking performance on ice and better handling stability on ice and snow, which are important properties for studless tires. In particular, owing to the zinc salt (a) or the mixture (b), the silica-containing rubber composition can be more easily processed and can be more effectively prevented from suffering reversion. Examples of the silica include, but not limited to, silica produced by a wet process and silica produced by a dry process.

The nitrogen adsorption specific surface area ($N_2SA$) of the silica is preferably 40 $m^2/g$ or greater, more preferably 50 $m^2/g$ or greater, further preferably 100 $m^2/g$ or greater, and particularly preferably 130 $m^2/g$ or greater. A silica having an $N_2SA$ of less than 40 $m^2/g$ may have insufficient reinforcing effects. The $N_2SA$ of the silica is preferably 450 $m^2/g$ or less, more preferably 400 $m^2/g$ or less, further preferably 300 $m^2/g$ or less, and particularly preferably 200 $m^2/g$ or less. Disadvantageously, a silica having an $N_2SA$ of more than 450 $m^2/g$ may be poorly dispersed and cause the rubber composition to have higher heat build-up.

The silica content is preferably 10 parts by mass or more, more preferably 15 parts by mass or more, further preferably 20 parts by mass or more, and most preferably 35 parts by mass or more per 100 parts by mass of the rubber component. A rubber composition having a silica content of less than 10 parts by mass is less likely to provide better braking performance on ice and better handling stability on ice and snow. The silica content is preferably 150 parts by mass or less, more preferably 120 parts by mass or less, further preferably 100 parts by mass or less, and most preferably 50 parts by mass or less per 100 parts by mass of the rubber component. Disadvantageously, a rubber composition having a silica content of more than 150 parts by mass may cause poor processability and workability.

The rubber composition preferably further contains a silane coupling agent.

The silane coupling agent may be any silane coupling agent conventionally used with silica in the rubber industries. Examples thereof include: sulfide-type silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropylmethacrylate monosulfide, and 3-trimethoxysilylpropylmethacrylate monosulfide; mercapto-type silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl-type silane coupling agents such as vinyltriethoxysilane and vinyltrimethoxysilane; amino-type silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy-type silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro-type silane coupling agents such as 3-nitropropyltrimethoxysilane and 3-nitropropyltriethoxysilane; and chloro-type silane coupling agents such as 3-chloropropyltrimethoxysilane, 3-chloropropyltriethoxysilane, 2-chloroethyltrimethoxysilane, and 2-chloroethyltriethoxysilane. Each of these silane coupling agents may be used alone, or two or more of these may be used in combination.

The amount of the silane coupling agent is preferably 1 part by mass or more, and more preferably 2 parts by mass or more per 100 parts by mass of the silica. A silane coupling agent in an amount of less than 1 part by mass may insufficiently exert its effects. The amount of the silane coupling agent is preferably 20 parts by mass or less, and more preferably 15 parts by mass or less per 100 parts by mass of the silica. Disadvantageously, a silane coupling agent in an amount of more than 20 parts by mass may fail to provide a coupling effect commensurate with the increased cost, and may provide poor reinforcement and poor abrasion resistance.

The rubber composition may further contain compounding ingredients conventionally used in the rubber industries, in addition to the aforementioned ingredients. Examples of the compounding ingredients include stearic acid, fillers such as carbon black and eggshell powder, antioxidants, antiozonants, age resistors, zinc oxide serving as a vulcanization acceleration aid, peroxides, vulcanizing agents such as sulfur and sulfur-containing compounds, and vulcanization accelerators.

The carbon black preferably has an average particle size of 30 nm or less and/or a DBP oil absorption of 100 ml/100 g or more. Such a carbon black may provide required reinforcement to treads of studless tires and ensure block rigidity, handling stability, partial-abrasion resistance, and abrasion resistance. A carbon black-containing rubber composition is likely to have a higher viscosity and therefore cause poor processability; however, in the case of containing the zinc salt (a) and/or the mixture (b), the unvulcanized rubber composition is allowed to have a lower viscosity and therefore better processability.

The carbon black content is preferably 2 parts by mass or more, more preferably 4 parts by mass or more, further preferably 8 parts by mass or more, and most preferably 20 parts by mass or more per 100 parts by mass of the rubber component. A rubber composition having a carbon black content of less than 2 parts by mass may provide insufficient reinforcement and may be less likely to provide the required block rigidity, handling stability, partial-abrasion resistance, and abrasion resistance. The carbon black content is preferably 120 parts by mass or less, more preferably 80 parts by mass or less, and further preferably 40 parts by mass or less per 100 parts by mass of the rubber component. A rubber composition having a carbon black content of more than 120 parts by mass may have poor processability and too high hardness.

The total amount of the silica and the carbon black is preferably 10 parts by mass or more, more preferably 30 parts by mass or more, further preferably 40 parts by mass or more, and particularly preferably 45 parts by mass or more per 100 parts by mass of the rubber component. The total amount thereof is preferably 150 parts by mass or less, more preferably 100 parts by mass or less, further preferably 80 parts by mass or less, and particularly preferably 65 parts by mass or less per 100 parts by mass of the rubber component. Together with the aforementioned ingredients, use of the silica and the carbon black in a total amount defined above can ensure excellent handling stability and abrasion resistance as well as good performance on ice and snow.

The zinc oxide serving as a vulcanization acceleration aid may be the same zinc oxide as in the aforementioned component (b). The amount of the zinc oxide as a vulcanization acceleration aid is preferably 1 part by mass or more, and more preferably 2 parts by mass or more per 100 parts by mass of the rubber component. Zinc oxide in an amount of less than 1 part by mass may fail to exert its effects. The amount thereof is preferably 10 parts by mass or less, and more preferably 7 parts by mass or less per 100 parts by mass of the rubber component. Zinc oxide in an amount of more than 10 parts by mass may fail to provide effects commensurate with the increased amount, and the cost tends to be high.

The rubber composition may contain zinc oxide whiskers. The zinc oxide whiskers can provide much better grip on ice. Advantageously, combination use of the zinc oxide whiskers with the zinc salt (a) and/or the mixture (b) may more greatly inhibit reversion.

The needle fiber length of the zinc oxide whiskers is preferably 1 μm or longer, and more preferably 10 μm or longer. The needle fiber length thereof is preferably 5000 μm or shorter, and more preferably 1000 μm or shorter. Zinc oxide whiskers having a needle fiber length of shorter than 1 μm are less likely to improve grip on ice. Zinc oxide whiskers having a needle fiber length of longer than 5000 μm tend to provide remarkably poor abrasion resistance.

The needle fiber diameter (average value) of the zinc oxide whiskers is preferably 0.2 μm or greater, and more preferably 0.5 μm or greater. The needle fiber diameter thereof is preferably 2000 μm or smaller and more preferably 200 μm or smaller. Zinc oxide whiskers having a needle fiber diameter of smaller than 0.2 μm are less likely to improve grip on ice. Zinc oxide whiskers having a needle fiber diameter of greater than 2000 μm tend to provide remarkably poor abrasion resistance.

The amount of the zinc oxide whiskers is preferably 0.3 parts by mass or more, more preferably 1.3 parts by mass or more, and further preferably 2.0 parts by mass or more per 100 parts by mass of the rubber component. The amount of the zinc oxide whiskers is preferably 30 parts by mass or less, and more preferably 15 parts by mass or less per 100 parts by mass of the rubber component. Zinc oxide whiskers in an amount of less than 0.3 parts by mass are less likely to improve cross-linking efficiency and grip on ice. Zinc oxide whiskers in an amount of more than 30 parts by mass tend to provide poor abrasion resistance and may lead to unnecessarily high costs.

The above tread has a JIS-A hardness of preferably 50 degrees or less, more preferably 48 degrees or less, and further preferably 46 degrees or less. A tread having a JIS-A hardness of 50 degrees or less may be flexible and have more excellent performance on ice and snow. Meanwhile, the JIS-A hardness is preferably 40 degrees or more. A tread having a JIS-A hardness of less than 40 degrees may be accompanied by poor processability of an unvulcanized rubber composition and may be less likely to have a suitable hardness that ensures handling stability.

The rubber composition of the present invention may be applied to tires of vehicles such as trucks and buses. In particular, the rubber composition of the present invention may be preferably applied to studless tires for passenger vehicles which require high handling stability on ice and snow. In addition, the rubber composition of the present invention may be suitably used for treads of studless tires.

The rubber composition of the present invention may be used for producing a studless tire by a common method. That is, the studless tire can be produced by preparing a tire tread with use of the rubber composition, assembling the tread with other components, and heating the assembled components under pressure on a tire building machine.

EXAMPLES

The present invention is more specifically described referring to, but not limited to, examples.

The respective chemical agents used in examples and comparative examples are listed below.

NR: RSS #3

BR 1: BR 150B (cis-1,4 bond content: 97%, $ML_{1+4}$ (100° C.): 40, viscosity of 5% solution in toluene at 25° C.: 48 cps, Mw/Mn: 3.3) produced by Ube Industries, Ltd.

BR 2: BR 360 L (cis-1,4 bond content: 98%, $ML_{1+4}$ (100° C.): 51, viscosity of 5% solution in toluene at 25° C.: 124 cps, Mw/Mn: 2.4) produced by Ube Industries, Ltd.

BR 3: BR A (a trial product, cis-1,4 bond content: 98%, $ML_{1+4}$ (100° C.): 47, viscosity of 5% solution in toluene at 25° C.: 122 cps, Mw/Mn: 3.3) produced by Ube Industries, Ltd.

Carbon black: DIABLACK I (ISAF carbon, average particle size: 23 nm, DBP oil absorption: 114 ml/100 g) produced by Mitsubishi Chemical Corporation Silica: Ultrasil VN3 ($N_2SA$: 175 m²/g) produced by Degussa AG Silane coupling agent: Si-69 produced by Degussa AG Mineral oil: PS-32 (paraffinic process oil) produced by Idemitsu Kosan Co., Ltd.

Stearic acid: KIRI produced by NOF Corporation

Aliphatic carboxylic acid: 2-ethylhexanoic acid produced by Wako Pure Chemical Industries, Ltd.

Anti-reversion agent 1: Struktol ZEH (zinc(II) 2-ethylhexanoate, carbon number: 8, zinc content: 23% by mass) produced by Schill+Seilacher Struktol AG Anti-reversion agent 2: PERKALINK 900 (1,3-bis(citraconimidomethyl)benzene) produced by Flexsys Anti-reversion agent 3: Zinc(II) butyrate (carbon number: 4, zinc content: 27% by mass) produced by Mitsuwa Chemicals Co., Ltd.

Anti-reversion agent 4: Zinc(II) octanoate (carbon number: 8, zinc content: 19% by mass) produced by Mitsuwa Chemicals Co., Ltd.

Anti-reversion agent 5: Zinc laurate (zinc(II) dodecanoate, carbon number: 12, zinc content: 14.1% by mass) produced by Wako Pure Chemical Industries, Ltd.

Zinc myristate (zinc aliphatic carboxylate): Zinc myristate (carbon number: 14, zinc content: 12.6% by mass) produced by Wako Pure Chemical Industries, Ltd.

Zinc oxide: Zinc oxide #2 produced by Mitsui Mining & Smelting Co., Ltd.

Zinc oxide whiskers: PANATETRA WZ-0501 (the number of protrusions: 4, needle fiber length: 2 to 50 µm, needle fiber diameter (average value): 0.2 to 3.0 µm) produced by AMTEC Co., Ltd.

Age resistor: NOCRAC 6C (N-(1,3-dimethylbutyl)-N'-phenyl-p-phenylenediamine) produced by OUCHI SHINKO CHEMICAL INDUSTRIAL CO., LTD.

Wax: OZOACE wax produced by Nippon Seiro Co., Ltd.

Sulfur: Sulfur powder produced by Tsurumi Chemical Industry Co., Ltd.

Vulcanization accelerator BBS: NOCCELER NS (N-tert-butyl-2-benzothiazolylsulfenamide) produced by OUCHI SHINKO CHEMICAL INDUSTRIAL Co., LTD.

Vulcanization accelerator DPG: NOCCELER D (N,N'-diphenylguanidine) produced by OUCHI SHINKO CHEMICAL INDUSTRIAL Co., LTD.

Examples 1 to 23 and Comparative Examples 1 to 13

The chemical agents were put into a Banbury mixer in amounts shown in Process 1 in Tables 1 and 2. They were then mixed and kneaded for 5 minutes so as to raise the outlet temperature to about 150° C. Thereafter, the sulfur and the vulcanization accelerators in amounts shown in Process 2 were added to the mixture obtained by Process 1. They were mixed and kneaded for 3 minutes at about 80° C. with an open roll mill. Whereby, an unvulcanized rubber composition was obtained. This unvulcanized rubber composition was formed into a tread shape, assembled with other tire components, and then vulcanized for 15 minutes at 170° C. Thus, studless tires were produced.

The respective samples were evaluated by the following methods.

(Reversion Resistance)

The vulcanization curve of the unvulcanized rubber composition at 170° C. was determined with a curelastometer. The maximum torque rise (MH-ML) was regarded as 100, and a torque rise obtained 15 minutes after the start of vulcanization was expressed as a relative value. Then, a value obtained by subtracting the relative value from 100 was regarded as a reversion ratio. A lower reversion ratio shows that the reversion is more inhibited and better reversion resistance is provided.

(Hardness)

The hardness of each of the vulcanized rubber composition samples in the examples and comparative examples was determined with a type A durometer in accordance with JIS K 6253 "Rubber, vulcanized or thermoplastic—Determination of hardness".

(Performance on Ice and Snow)

The studless tires of the examples and comparative examples were evaluated for on-vehicle performance on ice and snow under the following conditions. Here, studless tires for a passenger vehicle, which have a size of 195/65 R15 and a DS-2 pattern, were produced as the studless tires, and the tires were mounted on a Japanese-made FR car of 2000 cc displacement. The test was run on the test course of Sumitomo Rubber Industries, Ltd. in Nayoro, Hokkaido, Japan. The temperature on ice was from −6° C. to −1° C. and the temperature on snow was from −10° C. to −2° C.

Handling performance (feeling evaluation): The starting, accelerating, and stopping of the above car were evaluated by feeling. In the evaluation, the tire in Comparative Example 1 was regarded as the standard, performance of which was graded 100. Then, grading was performed in such a manner that the tires were graded 120 if the test driver judged that their performance was obviously improved, and the tires were graded 140 if the test driver judged that their performance was at a high level never seen before.

Braking performance (brake stopping distance on ice): The braking distance on ice, which is the distance required for the vehicle to stop after the brakes that lock up are applied at 30 km/h, was measured. Then, the braking distance in Comparative Example 1 was taken as a reference and the braking performance index was calculated by the following equation:

(Braking performance index)=(Braking distance in Comparative Example 1)/(Braking distance)×100.

A larger index shows better braking performance.

(Abrasion Resistance)

The studless tires were produced to have a size of 195/65 R15, and the tires were mounted on a Japanese-made FF car. The depth of grooves on the tire tread part was measured after the car had run 8000 km. The running distance that makes the depth of the tire grooves decrease by 1 mm was calculated, and the abrasion resistance was expressed with an index calculated by the following equation:

(Abrasion resistance index)=(Running distance that makes tire groove depth decrease by 1 mm)/(Running distance that makes tire groove depth in Comparative Example 1 decrease by 1 mm)×100.

A larger index shows better abrasion resistance.

Tables 1 and 2 show the evaluation results of the respective tests.

TABLE 1

| | | | Examples | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Composition (part(s) by weight) | Process 1 | NR | 60 | 50 | 40 | 40 | 40 | 40 | 40 | 40 | 40 | — | — | — |
| | | BR 1 | 40 | 50 | 60 | 60 | 60 | 60 | — | — | — | 100 | — | — |
| | | BR 2 | — | — | — | — | — | — | 60 | 60 | — | — | 100 | 100 |
| | | BR 3 | — | — | — | — | — | — | — | — | 60 | — | — | — |
| | | Carbon black | 30 | 30 | 30 | 30 | 30 | 30 | 30 | 5 | 5 | 30 | 30 | 5 |
| | | Silica | 25 | 25 | 25 | 25 | 25 | 25 | 25 | 50 | 50 | 25 | 25 | 50 |
| | | Silane coupling agent | 2.0 | 2.0 | 2.0 | 2.0 | 2.0 | 2.0 | 2.0 | 4.0 | 4.0 | 2.0 | 2.0 | 4.0 |
| | | Mineral oil | 25 | 25 | 25 | 25 | 25 | 25 | 25 | 25 | 25 | 25 | 25 | 25 |
| | | Stearic acid | 1 | 1 | 1 | 1 | 1 | — | 1 | 1 | 1 | 1 | 1 | 1 |
| | | Aliphatic carboxylic acid | — | — | — | — | — | — | — | — | — | — | — | — |
| | | Anti-reversion agent 1 | 3 | 3 | 3 | 0.7 | 5 | 3 | 3 | 3 | 3 | 3 | 3 | 3 |
| | | Anti-reversion agent 2 | — | — | — | — | — | — | — | — | — | — | — | — |
| | | Anti-reversion agent 3 | — | — | — | — | — | — | — | — | — | — | — | — |
| | | Anti-reversion agent 4 | — | — | — | — | — | — | — | — | — | — | — | — |
| | | Anti-reversion agent 5 | — | — | — | — | — | — | — | — | — | — | — | — |
| | | Zinc myristate | — | — | — | — | — | — | — | — | — | — | — | — |
| | | Zinc oxide | 3 | 3 | 3 | 3 | 3 | 3 | 3 | 3 | 3 | 3 | 3 | 3 |
| | | Zinc oxide whiskers | — | — | — | — | — | — | — | — | — | — | — | — |
| | | Age resistor | 1.5 | 1.5 | 1.5 | 1.5 | 1.5 | 1.5 | 1.5 | 1.5 | 1.5 | 1.5 | 1.5 | 1.5 |
| | | Wax | 1 | 1 | 1 | 1 | 1 | 1 | 1 | 1 | 1 | 1 | 1 | 1 |
| | Process 2 | Sulfur | 1.5 | 1.5 | 1.5 | 1.5 | 1.5 | 1.5 | 1.5 | 1.5 | 1.5 | 1.5 | 1.5 | 1.5 |
| | | Vulcanization accelerator BBS | 1.0 | 1.0 | 1.0 | 1.0 | 1.0 | 1.0 | 1.0 | 1.0 | 1.0 | 1.0 | 1.0 | 1.0 |
| | | Vulcanization accelerator | 1.5 | 1.5 | 1.5 | 1.5 | 1.5 | 1.5 | 1.5 | 1.5 | 1.5 | 1.5 | 1.5 | 1.5 |
| Evaluations | | Reversion ratio | 2 | 1 | 0.5 | 7 | 0.5 | 0.7 | 0.5 | 0.5 | 0.5 | 2 | 1 | 1 |
| | | Hardness | 45 | 45 | 46 | 46 | 46 | 46 | 46 | 45 | 44 | 47 | 47 | 46 |
| | | Handling performance (on snow) | 120 | 128 | 135 | 123 | 137 | 135 | 136 | 143 | 148 | 128 | 130 | 128 |
| | | Braking performance (on ice) | 102 | 107 | 111 | 111 | 110 | 113 | 110 | 123 | 123 | 130 | 127 | 140 |
| | | Abrasion resistance | 106 | 106 | 105 | 101 | 106 | 107 | 115 | 105 | 108 | 95 | 105 | 101 |

| | | | Examples | | | | | | | | | | |
|---|---|---|---|---|---|---|---|---|---|---|---|---|---|
| | | | 13 | 14 | 15 | 16 | 17 | 18 | 19 | 20 | 21 | 22 | 23 |
| Composition (part(s) by weight) | Process 1 | NR | — | — | 40 | — | 40 | 40 | 40 | 40 | 40 | 40 | 40 |
| | | BR 1 | — | — | 60 | 100 | 60 | 60 | 60 | 60 | 60 | 60 | 60 |
| | | BR 2 | — | — | — | — | — | — | — | — | — | — | — |
| | | BR 3 | 100 | 100 | — | — | — | — | — | — | — | — | — |
| | | Carbon black | 30 | 5 | 30 | 30 | 30 | 30 | 30 | 30 | 30 | 30 | 30 |
| | | Silica | 25 | 50 | 25 | 25 | 25 | 25 | 25 | 25 | 25 | 25 | 25 |
| | | Silane coupling agent | 2.0 | 4.0 | 2.0 | 2.0 | 2.0 | 2.0 | 2.0 | 2.0 | 2.0 | 2.0 | 2.0 |
| | | Mineral oil | 25 | 25 | 25 | 25 | 25 | 25 | 25 | 25 | 25 | 25 | 25 |
| | | Stearic acid | 1 | 1 | 1 | 1 | 1 | 1 | 1 | 1 | 1 | 1 | 1 |
| | | Aliphatic carboxylic acid | — | — | — | — | 2.4 | 2.4 | — | — | — | — | — |
| | | Anti-reversion agent 1 | 3 | 3 | 3 | 3 | — | — | — | — | — | — | — |
| | | Anti-reversion agent 2 | — | — | — | — | — | — | — | — | — | — | — |
| | | Anti-reversion agent 3 | — | — | — | — | — | — | 3 | — | — | — | — |
| | | Anti-reversion agent 4 | — | — | — | — | — | — | — | 3 | 3 | — | — |
| | | Anti-reversion agent 5 | — | — | — | — | — | — | — | — | — | 3 | 3 |
| | | Zinc myristate | — | — | — | — | — | — | — | — | — | — | — |
| | | Zinc oxide | 3 | 3 | 3 | 3 | 3.8 | 3.8 | 3 | 3 | 3 | 3 | 3 |
| | | Zinc oxide whiskers | — | — | 5 | 5 | — | 5 | 5 | — | 5 | — | 5 |
| | | Age resistor | 1.5 | 1.5 | 1.5 | 1.5 | 1.5 | 1.5 | 1.5 | 1.5 | 1.5 | 1.5 | 1.5 |
| | | Wax | 1 | 1 | 1 | 1 | 1 | 1 | 1 | 1 | 1 | 1 | 1 |
| | Process 2 | Sulfur | 1.5 | 1.5 | 1.5 | 1.5 | 1.5 | 1.5 | 1.5 | 1.5 | 1.5 | 1.5 | 1.5 |
| | | Vulcanization accelerator BBS | 1.0 | 1.0 | 1.0 | 1.0 | 1.0 | 1.0 | 1.0 | 1.0 | 1.0 | 1.0 | 1.0 |
| | | Vulcanization accelerator | 1.5 | 1.5 | 1.5 | 1.5 | 1.5 | 1.5 | 1.5 | 1.5 | 1.5 | 1.5 | 1.5 |
| Evaluations | | Reversion ratio | 1 | 1 | 0.2 | 0.5 | 2 | 1 | 7 | 4 | 2 | 7 | 3 |
| | | Hardness | 46 | 45 | 47 | 48 | 45 | 46 | 44 | 44 | 45 | 44 | 45 |
| | | Handling performance (on snow) | 130 | 127 | 137 | 136 | 120 | 130 | 110 | 125 | 130 | 110 | 128 |
| | | Braking performance (on ice) | 132 | 145 | 130 | 140 | 110 | 120 | 115 | 105 | 115 | 112 | 122 |
| | | Abrasion resistance | 105 | 101 | 107 | 99 | 104 | 105 | 103 | 104 | 104 | 105 | 105 |

TABLE 2

| | | | Comparative Examples | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Composition (part(s) by weight) | Process 1 | NR | 60 | 60 | 50 | 50 | 40 | 40 | — | — | 100 | 100 | 100 | 70 | 40 |
| | | BR 1 | 40 | 40 | 50 | 50 | 60 | 60 | 100 | 100 | — | — | — | 30 | 60 |
| | | BR 2 | — | — | — | — | — | — | — | — | — | — | — | — | — |
| | | BR 3 | — | — | — | — | — | — | — | — | — | — | — | — | — |

TABLE 2-continued

|  |  | Comparative Examples | | | | | | | | | | | | |
|---|---|---|---|---|---|---|---|---|---|---|---|---|---|
|  |  | 1 | 2 | 3 | 4 | 5 | 6 | 7 | 8 | 9 | 10 | 11 | 12 | 13 |
|  | Carbon black | 30 | 30 | 30 | 30 | 30 | 30 | 30 | 30 | 30 | 30 | 30 | 30 | 30 |
|  | Silica | 25 | 25 | 25 | 25 | 25 | 25 | 25 | 25 | 25 | 25 | 25 | 25 | 25 |
|  | Silane coupling agent | 2.0 | 2.0 | 2.0 | 2.0 | 2.0 | 2.0 | 2.0 | 2.0 | 2.0 | 2.0 | 2.0 | 2.0 | 2.0 |
|  | Mineral oil | 25 | 25 | 25 | 25 | 25 | 25 | 25 | 25 | 25 | 25 | 25 | 25 | 25 |
|  | Stearic acid | 1 | 1 | 1 | 1 | 1 | 1 | 1 | 1 | 1 | 1 | 1 | 1 | 1 |
|  | Aliphatic carboxylic acid | — | — | — | — | — | — | — | — | — | — | — | — | — |
|  | Anti-reversion agent 1 | — | — | — | — | — | — | — | — | — | 3 | — | 3 | — |
|  | Anti-reversion agent 2 | — | 1 | — | 1 | — | 1 | — | 1 | — | — | 1 | — | — |
|  | Anti-reversion agent 3 | — | — | — | — | — | — | — | — | — | — | — | — | — |
|  | Anti-reversion agent 4 | — | — | — | — | — | — | — | — | — | — | — | — | — |
|  | Anti-reversion agent 5 | — | — | — | — | — | — | — | — | — | — | — | — | — |
|  | Zinc myristate | — | — | — | — | — | — | — | — | — | — | — | — | 3 |
|  | Zinc oxide | 3 | 3 | 3 | 3 | 3 | 3 | 3 | 3 | 3 | 3 | 3 | 3 | 3 |
|  | Zinc oxide whiskers | — | — | — | — | — | — | — | — | — | — | — | — | — |
|  | Age resistor | 1.5 | 1.5 | 1.5 | 1.5 | 1.5 | 1.5 | 1.5 | 1.5 | 1.5 | 1.5 | 1.5 | 1.5 | 1.5 |
|  | Wax | 1 | 1 | 1 | 1 | 1 | 1 | 1 | 1 | 1 | 1 | 1 | 1 | 1 |
| Process 2 | Sulfur | 1.5 | 1.5 | 1.5 | 1.5 | 1.5 | 1.5 | 1.5 | 1.5 | 1.5 | 1.5 | 1.5 | 1.5 | 1.5 |
|  | Vulcanization accelerator BBS | 1.0 | 1.0 | 1.0 | 1.0 | 1.0 | 1.0 | 1.0 | 1.0 | 1.0 | 1.0 | 1.0 | 1.0 | 1.0 |
|  | Vulcanization accelerator DPG | 1.5 | 1.5 | 1.5 | 1.5 | 1.5 | 1.5 | 1.5 | 1.5 | 1.5 | 1.5 | 1.5 | 1.5 | 1.5 |
| Evaluations | Reversion ratio | 15 | 7 | 11 | 9 | 13 | 11 | 9 | 9 | 13 | 2 | 9 | 3 | 10 |
|  | Hardness | 46 | 46 | 45 | 45 | 46 | 46 | 46 | 46 | 43 | 44 | 44 | 43 | 45 |
|  | Handling performance (on snow) | 100 | 102 | 105 | 106 | 110 | 111 | 112 | 112 | 90 | 100 | 95 | 115 | 112 |
|  | Braking performance (on ice) | 100 | 100 | 103 | 103 | 109 | 109 | 129 | 126 | 90 | 90 | 87 | 96 | 110 |
|  | Abrasion resistance | 100 | 103 | 97 | 99 | 94 | 95 | 81 | 84 | 110 | 116 | 114 | 110 | 95 |

The samples in the examples had a low reversion ratio and good reversion resistance. Further, the samples in the examples each had an appropriate hardness, and provided good handling performance on snow and good braking performance on ice. In particular, the samples in the examples with a higher BR content or a higher silica content provided much better braking performance on ice and good handling performance on snow.

In Examples 7 to 9 and 11 to 14, the rubber compositions contained the BR having a cis content of 95% or more, a viscosity of a 5% solution in toluene at 25° C. of 80 to 200 cps (further, 110 to 150 cps), and an Mw/Mn of 3.0 or lower or of 3.0 to 3.4, and they exhibited better processability and better abrasion resistance. In particular, the better processability led to better dispersion state of the silica, and thus allowed the rubber composition containing a larger amount of the silica to have better abrasion resistance. Further, combination use of the zinc salt of a C4-C12 aliphatic carboxylic acid with the BR provided much better reversion resistance. Thus, particularly in the case of a higher BR content, excellent handling performance and excellent braking performance on ice were provided while the abrasion resistance was suitably maintained.

In Comparative Examples 1, 3, 5, and 7, the rubber compositions contained the BR and did not contain an anti-reversion agent, and they exhibited a high reversion ratio and poor reversion resistance, and provided poor handling performance. In Comparative Examples 2, 4, 6, and 8, the rubber compositions contained the BR and the anti-reversion agent 2, and they provided poor handling performance and had slightly poor reversion resistance.

The rubber composition that contained only the NR as the rubber component and did not contain an anti-reversion agent in Comparative Example 9 and the rubber composition that contained only the NR as the rubber component and further contained the anti-reversion agent 2 in Comparative Example 11 each had poor reversion resistance. In addition, these rubber compositions provided poor handling performance and braking performance on ice and snow. The rubber composition that contained only the NR as the rubber component and further contained the anti-reversion agent 1 in Comparative Example 10 had good reversion resistance, but provided poor handling performance on snow and poor braking performance on ice. Also, the rubber composition that contained the BR in an amount as small as 30% by mass and further contained the anti-reversion agent 1 in Comparative Example 12 had good reversion resistance, but provided poor handling performance on snow and poor braking performance on ice.

In Examples 17 and 18, the rubber compositions contained a mixture of 2-ethylhexanoic acid and zinc oxide, and they exhibited improved properties, in particular, excellent reversion resistance, handling performance and abrasion resistance, compared with the rubber composition in Comparative Example 5, which did not contain an anti-reversion agent, and the rubber composition in Comparative Example 6, which contained the anti-reversion agent 2. The rubber compositions that contained the anti-reversion agent 3 or 5 in Examples 19, 22 and 23 provided better reversion resistance and better handling performance on snow, and also had good abrasion resistance. In particular, the rubber compositions that contained zinc oxide whiskers in Examples 19 and 23 provided better braking performance on ice. The rubber compositions that contained the anti-reversion agent 4 in Examples 20 and 21 provided better reversion resistance, better handling performance on snow, and better braking performance on ice and also had good abrasion resistance, although they were slightly inferior to the rubber compositions in Examples 5 and 15, which contained the anti-reversion agent 1 that is a zinc salt of a branched fatty acid having the same carbon number as that of the anti-reversion agent 4. On the other hand, the rubber composition that contained zinc myristate, which has a carbon number beyond the range according to the present invention, in Comparative Example 13 exhibited poor reversion resistance and in particular poor abrasion resistance, and also had poor balance between performances.

The invention claimed is:
1. A studless tire, comprising:
a tread produced from a rubber composition, comprising:
a rubber component;

a zinc salt of a C4-C12 aliphatic carboxylic acid, or a C4-C12 aliphatic carboxylic acid and zinc oxide; and an oil or a plasticizer, the rubber component containing 40% by mass or more of butadiene rubber per 100% by mass of the rubber component.

2. The studless tire according to claim 1, wherein the rubber composition further comprises 10 parts by mass or more of silica per 100 parts by mass of the rubber component.

3. The studless tire according to claim 1, wherein the rubber composition further comprises 10 to 150 parts by mass of silica and 2 to 120 parts by mass of carbon black, per 100 parts by mass of the rubber component, the total amount of the silica and the carbon black being 10 to 150 parts per 100 parts by mass of the rubber component.

4. The studless tire according to claim 1, wherein the rubber composition comprises 5 parts by mass or more of an oil or plasticizer per 100 parts by mass of the rubber component.

5. The studless tire according to claim 1, wherein the rubber composition comprises 15 parts by mass or more of an oil or plasticizer per 100 parts by mass of the rubber component.

6. The studless tire according to claim 1, wherein the rubber component contains further natural rubber and/or epoxidized natural rubber.

7. The studless tire according to claim 1, wherein the total amount of butadiene rubber, natural rubber, epoxidized natural rubber, and isoprene rubber in the rubber component is 70% by mass or more.

8. The studless tire according to claim 1, wherein the aliphatic carboxylic acid, in the zinc salt of the C4-C12 aliphatic carboxylic acid, and the C4-C12 aliphatic carboxylic acid and zinc oxide, is saturated fatty acid and/or unsaturated fatty acid.

9. The studless tire according to claim 1, wherein the aliphatic carboxylic acid, in the zinc salt of the C4-C12 aliphatic carboxylic acid, and the C4-C12 aliphatic carboxylic acid and zinc oxide, is at least one member selected from the group consisting of butanoic acid, pentanoic acid, hexanoic acid, heptanoic acid, octanoic acid, nonanoic acid, decanoic acid, undecanoic acid, dodecanoic acid, isobutyric acid, isopentanoic acid, pivalic acid, isohexanoic acid, isoheptanoic acid, isooctanoic acid, dimethyloctanoic acid, isononanoic acid, isodecanoic acid, isoundecanoic acid, isododecanoic acid, 2-ethylbutyric acid, 2-ethylhexanoic acid, 2-butyloctanoic acid, succinic acid, glutaric acid, adipic acid, pimelic acid, suberic acid, sebacic acid, butenoic acid, pentenoic acid, hexenoic acid, heptenoic acid, octenoic acid, nonenoic acid, decenoic acid, undecenoic acid, and dodecenoic acid.

10. The studless tire according to claim 1, wherein the tread has a JIS-A hardness of 50 degrees or less.

* * * * *